Nov. 1, 1960     E. W. BULLOCK     2,958,460
CENTRIFUGAL FAN
Filed Dec. 16, 1957     2 Sheets-Sheet 1
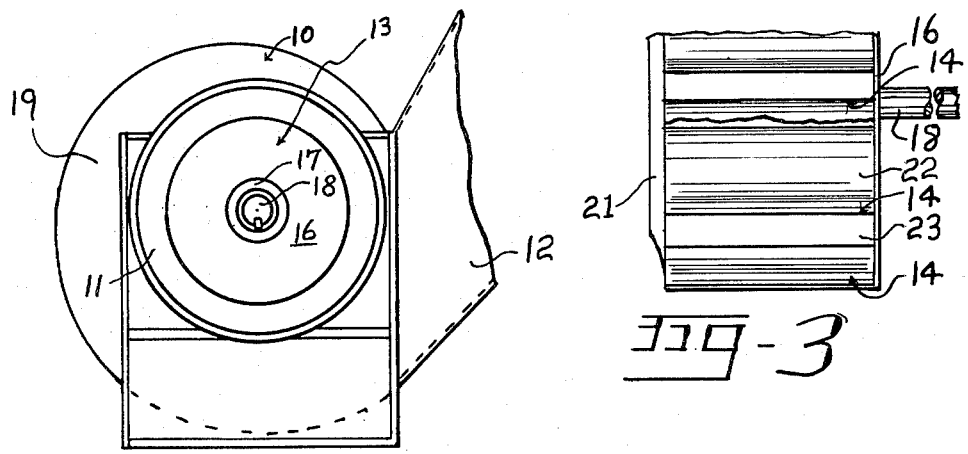
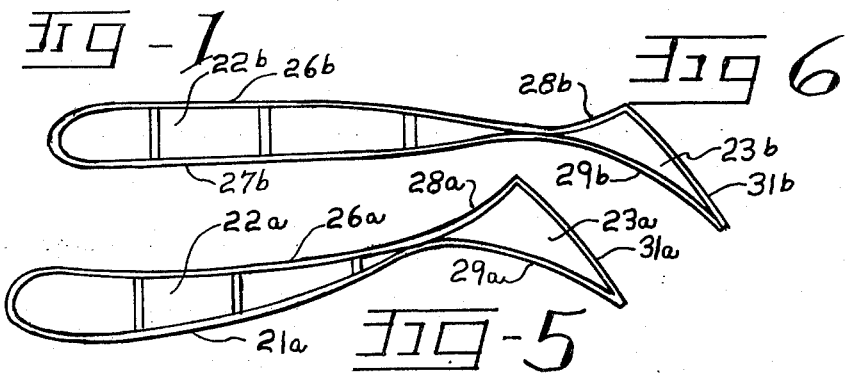
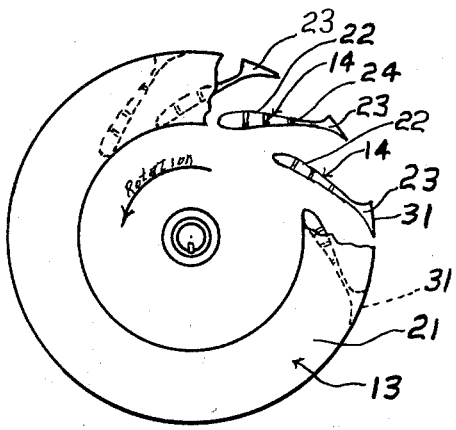
INVENTOR.
Ellis W. Bullock
BY
Attorneys

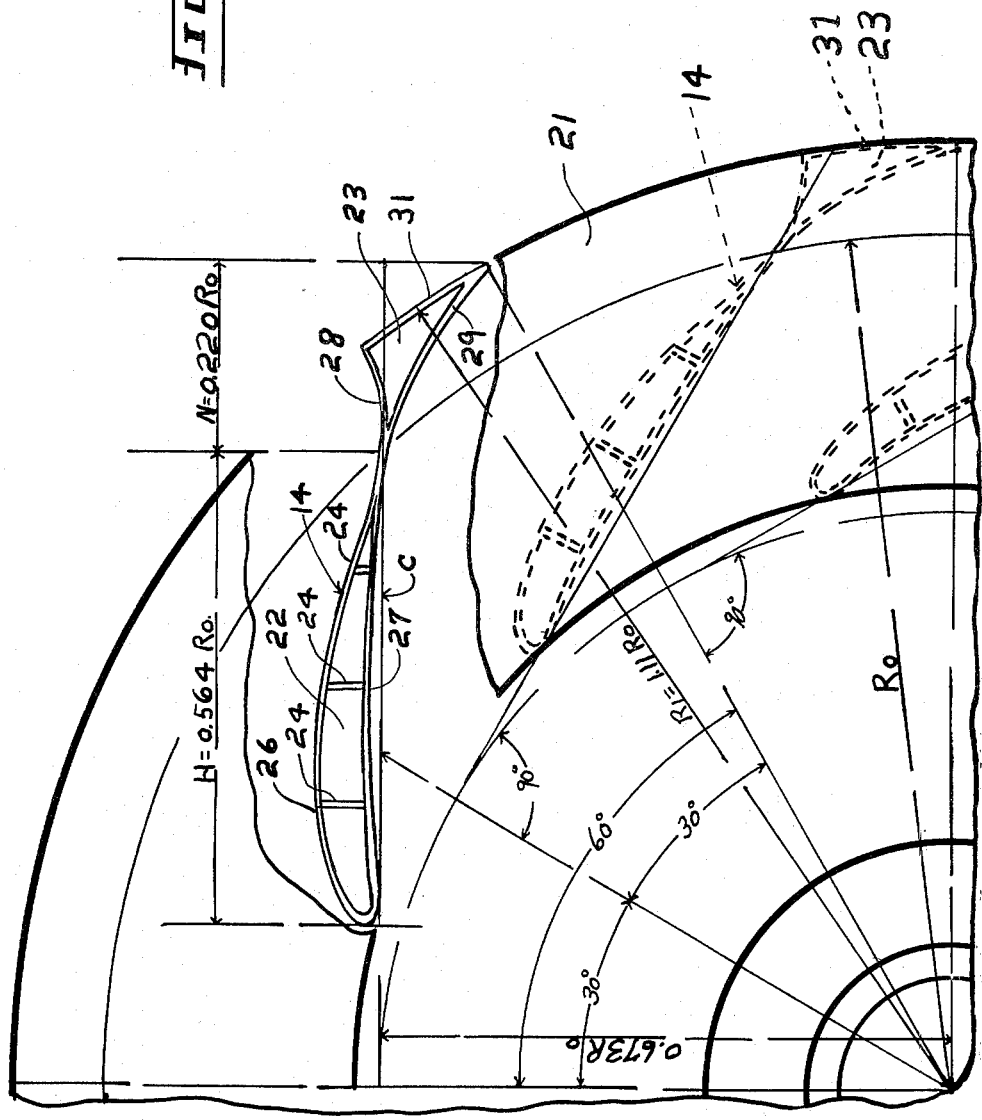

United States Patent Office 2,958,460
Patented Nov. 1, 1960

2,958,460
CENTRIFUGAL FAN

Ellis W. Bullock, P.O. Box 1883, Birmingham, Ala.

Filed Dec. 16, 1957, Ser. No. 702,844

2 Claims. (Cl. 230—134)

My invention relates to centrifugal fans and more particularly to an improvement in centrifugal fans of the so-called forward curved blade type.

Heretofore, in the art of centrifugal fans in general, there have been three well recognized types of blades employed. These are the straight radial blade, the forward curved blade and the backward curved blade. Also, as well known, each of these specific types of fans is adapted to different uses and each has its own peculiar characteristics relative to efficiency, volume and pressure. It is well known that with respect to backward curved blade fans, an airfoil section blade gives higher static efficiency than a flat blade. So far as I am aware no substantial attempts have been made to employ in a forward curved blade type centrifugal fan a leading section of airfoil shape and a forward curved trailing section connected thereto having surfaces thereon diverging from the surfaces of the leading section.

It is an object of my invention to provide in a forward curved blade fan a blade section comprised essentially of two parts, one of which is a leading section of airfoil shape having streamlines formed by the upper and lower surfaces thereof, and the other a forward curved trailing section connected to the rear of the leading section. The forward curved trailing section has upper and lower surfaces thereon forming smooth continuations of the streamlines of the leading section.

It is a further object of my invention to provide a forward curved centrifugal fan blade having a leading section of airfoil shape and a forward curved trailing section with upper and lower curved surfaces that diverge from the streamlines at the rear of the leading section, and thereby change the direction of airflow from that of the leading section. Further, in order to eliminate undesirable turbulence rearwardly of the upper and lower surfaces of the trailing section, I preferably streamline the trailing section at its trailing edge by means of fairing. Such fairing may be a radially curved peripheral plate member extending between and connecting the rear extremities of the upper and lower curved surfaces on the trailing section, which may diverge from each other.

In experiments so far conducted with the apparatus forming the subject matter of this application I have found that worthwhile and important increases in efficiency may be obtained by utilizing the principles of my invention. For instance, in tests run with a fan delivering approximately 160,000 cu. ft. per minute at 15.2 inches static pressure (water gauge), at a power input of approximately 468 H.P., I obtained a static efficiency of approximately 82%. It will be apparent to those skilled in the art that an efficiency of 82% represents a considerable increase in efficiency over centrifugal fans employing prior types of forward curved blades.

Apparatus embodying features of my invention is illustrated in the accompanying drawings forming a part of this application in which:

Fig. 1 is a side elevational view of a centrifugal fan embodying the present invention and showing the inlet and outlet air ducts for such a fan;

Fig. 2 is a side elevational view of the impeller of the centrifugal fan shown in Fig. 1 with a portion of the shroud ring broken away and showing my improved fan blades;

Fig. 3 is a fragmentary top plan view of the impeller shown in Fig. 2 with a portion of one top blade broken away so that a complete fan blade is seen in plan view;

Fig. 4 is an enlarged diagrammatic fragmentary side elevational view of the impeller and showing for purposes of illustration a specific design of the fan blade of my invention embodying a forward curved trailing section connected to the rear of a rearward curved leading section;

Fig. 5 is a sectional view of a modification of the fan blade of my invention embodying a forward curved leading section and a forward curved trailing section connected to the rear thereof; and, Fig. 6 is a sectional view of a further modification of the fan blade of my invention embodying a leading section of symmetrical airfoil shape and a forward curved trailing section connected thereto.

Referring now in detail to the drawing for a better understanding of my invention, a typical centrifugal fan 10 is shown in Fig. 1 comprising an air inlet 11 and an air outlet duct 12, the direction of the arrows indicating the direction of airflow. An impeller indicated generally by the numeral 13 is shown arranged within centrifugal fan 10 and comprises a plurality of blades 14. Impeller 13 comprises a back plate member 16 on which a hub 17 is centrally arranged. A shaft 18 is secured to hub 17 and is driven by a suitable motor (not shown) preferably positioned adjacent the fan 10, the impeller 13 thereby being cantilevered on shaft 18.

A casing or scroll 19 is arranged about the impeller 13 with suitable clearance between the blades and the casing. The inlet 11 and outlet 12 for the fan are preferably converging and diverging passages, respectively.

As shown in Figs. 2, 3 and 4 the blades 14 are secured on one end to the inner surface of back plate 16 and the other end of blades 14 is secured to a shroud ring 21 extending to the outer extremity of blades 14. Each of the blades 14 comprises a leading section 22 of airfoil shape and a forward curved trailing section 23 connected to the rear of leading section 22. If desired to reinforce the leading section 22, bars 24 may be laterally spaced therein as shown in Figs. 2 and 4. The leading section of airfoil shape can obviously be of various designs and may be rearwardly curved, forwardly curved, or of a symmetrical section. The leading section 22 shown in Figs. 1 through 4 comprises a backward curved leading section 22 arranged with an upper surface 26 and a lower surface 27 which surfaces form streamlines for section 22 and converge at the rear thereof. Lower surface 27 is concave while upper surface 26 is convex.

The forward curved trailing section 23 is arranged with an upper surface 28 and a lower surface 29 which surfaces diverge from the rear of leading section 22. The upper surface 28 and lower surface 29 of trailing section 23 form smooth continuations of the streamlines of leading section 22 while changing the direction of airflow from the leading section 22. Air flowing past leading section 22 thus is given a forward component of movement when it contacts trailing section 23.

In order to eliminate any turbulence that may be created rearwardly of upper surface 28 and lower surface 29 on trailing section 23, fairing is provided between and connecting the outer extremities of surfaces 28 and 29. The function of the fairing is to produce a smooth outline and reduce drag, and may preferably comprise a radially curved plate member 31 struck on a radius from the eye of the fan 10. Surfaces 28 and 29 may also be formed of plate members.

As mentioned above, the leading section may be formed of either a forward curved or a symmetrical airfoil shape as well as the rearward curved airfoil shape shown in Figs. 1 through 4. In Fig. 5 a leading section 22a is shown in a forward curved airfoil shape having an upper surface 26a and a lower surface 27a which surfaces converge at the rear of section 22a. A forward curved trailing section 23a is connected to the rear of section 22a and is arranged with an upper surface 28a and lower surface 29a which surfaces diverge from the rear of leading section 22a. Thus, the upper surface 26a is concave and lower surface 27a is convex. A fairing 31a similar to that disclosed in Figs. 1 through 4 is connected between the rear extremities of surfaces 28a and 29a.

In Fig. 6, a further modification of an airfoil leading section of my invention is disclosed in which the leading section 22b is of a symmetrical airfoil shape and comprises an upper surface 26b and lower surface 27b which surfaces converge at the rear of section 22b. A forward curved trailing section 23b is connected to the rear of section 22b and is arranged with an upper surface 28b and a lower surface 29b which surfaces diverge from the rear of leading section 22b. Both the upper surface 26b and the lower surface 27b are convex. Fairing 31b similar to that of the other embodiments is arranged between the rear extremities of surfaces 28b and 29b.

In order to obtain a specific design for the airfoil shape of the backward curved leading section 22 shown for instance in Figs. 1 through 4, reference was made to "The Characteristics of 78 Related Airfoil Sections from Tests in the Variable-Density Wind Tunnel," Report No. 460, by the "National Advisory Committee for Aeronautics" (N.A.C.A.) dated 1939, originally published November, 1933. An airfoil designation of 9514 (N.A.C.A.) was found to be effective. As explained in the above mentioned "Report No. 460", the designation 9514 contains four digits, the first digit being the maximum camber in percent of the chord length, the second digit being the position of the maxium camber in tenths of the chord length from the leading edge, and the last two digits being the maximum thicknesss of the airfoil in percent of the chord length. Thus the maximum camber is 9% of the chord length; the position of the maximum camber is .5 of the chord length; and the maximum thickness of the airfoil is 14% of the chord length.

The chord line is indicated by C and is a straight line joining the lower surface of the airfoil leading section 22 at two points and extending for the length of the airfoil section as determined by the extremities of the mean line. The mean line is the curvature of the median line of the airfoil section, not shown on the drawing. Camber is the maximum ordinate of the mean line, and the position of the maximum ordinate of the mean line is the position of maximum camber. For further explanation, reference may be had to the above mentioned Report No. 460 of the "National Advisory Committee for Aeronautics."

For the layout of the leading section 22, the following Table No. 1 is given in which stations are taken along the chord line indicated by the letter C and in percentages of the length H of the chord line. The upper and lower surfaces of leading section 22 are also given in percentages of the chord length H for section 22.

Table No. 1

| Stations Along Chord Line in Percentage of Chord Length H | Upper Surface of Section 22 in Percentage of Chord Length H | Lower Surface of Section 22 in Percentage of Chord Length H |
| --- | --- | --- |
| 0 | +.5 | 0 |
| 10 | +11.75 | 0 |
| 20 | +14 | +0.25 |
| 30 | +15.55 | +1.5 |
| 40 | +15.5 | +2.3 |
| 50 | +15.44 | +2.85 |
| 60 | +14.5 | +2.85 |
| 70 | +12.5 | +2.6 |
| 80 | +9.0 | +2.0 |
| 90 | +5.75 | +1.25 |
| 100 | +1.25 | +0 |

The distance of chord C from the eye of fan 10 has a direct relationship to the distance of the rear of trailing section 22 from the eye of the fan which is indicated by $R_o$. In my specific example the distance from the eye of the fan normal to chord C is equal to 0.673 $R_o$. Plate member 31 is spaced from the center of the impeller the distance indicated by the letter $R_1$, which is equal to 1.11 $R_o$. The length H of chord C for airfoil section 22 is equal to 0.564 $R_o$, while the length of the base line for trailing section 23 is indicated by N and is equal to 0.220 $R_o$.

In order to determine the shape of the trailing section 23 the following Table No. 2 is given in which the stations are spaced along the base line of the trailing section 23. The distances of the upper and lower surfaces from the base line are given in percentages of the base line length N.

Table No. 2

| Stations Along Base Line in Percentages of Base Line Length N | Upper Surface of Section 23 in Percentage of Base Line Length N | Lower Surface of Section 23 in Percentage of Base Line Length N |
| --- | --- | --- |
| 0 | +2.5 | 0 |
| 10 | +0.625 | −2.50 |
| 20 | +0 | −4.62 |
| 30 | +1.25 | −7.5 |
| 40 | +4.25 | −11.25 |
| 50 | +10.0 | −16.0 |
| 55 | +13.9 | −18.75 |
| 60 | +8.75 | −21.25 |
| 66.25 | +0 | −25.00 |
| 70 | −5.0 | −27.5 |
| 80 | 18.75 | −35.0 |
| 90 | −34.4 | −43.75 |
| 100 | −51.25 | −51.25 |

From the foregoing, it is apparent that I have provided a fan blade having a leading section of airfoil shape and a forward curved trailing section connected to the rear of the leading section with the upper surface of the trailing section forming a continuation of the streamlines of the leading section and changing the direction of air flowing therefrom. The upper and lower surfaces of the leading section converge at the rear end thereof while the upper and lower surfaces of the trailing section may diverge from the rear of the leading section. Also, I may employ the radially curved plate members 31, 31a or 31b between the rear extremities of the upper and lower surfaces of the trailing section to minimize turbulence rearwardly of the trailing section. Fans embodying my invention are characterized by an increase in efficiency over prior types of centrifugal fans employing forward curved blades.

While I have shown my invention in several forms, it will be obvious to those skilled in the art that it is not so limited, but is susceptible to various changes and modifications without departing from the spirit thereof, and I desire, therefore, that only such limitations shall be placed thereupon as are specifically set forth in the appended claims.

The use of the words "air" and "airflow" in describing the operation of my improved fan is intended to embrace all other gaseous fluids which are handled by the fan.

What I claim is:

1. In a centrifugal air fan having a central eye into which air is drawn, an impeller comprising a back plate with a hub arranged centrally thereon, a shaft secured to said hub for rotating said impeller, a plurality of substantially equally spaced blades mounted on said back plate adjacent the outer circumference thereof and extending outwardly from the back plate, a shroud ring mounted over the extending ends of said blades opposite the back plate, each of said blades comprising an elongated hollow leading section of airfoil shape and a hollow forward curved trailing section connected to the rear of said leading section, said leading section being of a maximum thickness of about 14 percent of its length and having lower and upper surfaces formed of plate members which converge at the rear end thereof to form a narrow section thereat, said trailing section having upper and lower curved surfaces diverging from each other from the converging plate members of the leading section and forming smooth continuations of the upper and lower surfaces on the leading section, and said leading section being of a length about two and one-half times greater than the length of said trailing section, said fan having a radius measured from the eye of the fan to the narrow section formed by the converging plate members of said leading section and the leading edge of said blades being positioned from the eye of the fan a distance about two-thirds of said radius.

2. A fan blade as defined in claim 1 in which the trailing section has a radially curved outer tip portion struck on a radius from the eye of the fan and extending between and connecting the outer extremities of said upper and lower surfaces of the trailing section.

References Cited in the file of this patent

UNITED STATES PATENTS

| | | |
|---|---|---|
| 487,883 | Ruble | Dec. 13, 1892 |
| 1,030,561 | Blackmer | June 25, 1912 |
| 1,633,609 | Schmidt | June 28, 1927 |
| 1,906,180 | Rees | Apr. 25, 1933 |
| 2,083,996 | Jonn | June 15, 1937 |
| 2,111,136 | Bauer | Mar. 15, 1938 |
| 2,264,071 | Dibovsky | Nov. 25, 1941 |
| 2,285,266 | Fullemann | June 2, 1942 |

FOREIGN PATENTS

| | | |
|---|---|---|
| 4,916 | Great Britain | 1876 |
| 52,538 | Holland | Apr. 18, 1942 |
| 586,010 | Germany | Oct. 14, 1933 |
| 608,703 | Great Britain | Sept. 20, 1948 |
| 653,161 | Great Britain | May 9, 1951 |
| 690,118 | France | June 10, 1930 |